United States Patent [19]

Levy

[11] Patent Number: 4,949,176

[45] Date of Patent: Aug. 14, 1990

[54] METHOD AND APPARATUS FOR DPCM VIDEO SIGNAL COMPRESSION AND TRANSMISSION

[75] Inventor: David F. Levy, Hampshire, England

[73] Assignee: Sony Corporation, Tokyo, Japan

[21] Appl. No.: 167,186

[22] Filed: Mar. 11, 1988

[30] Foreign Application Priority Data

Mar. 30, 1987 [GB] United Kingdom ............... 8707556

[51] Int. Cl.$^5$ ............................................... H04N 7/12
[52] U.S. Cl. ...................................... 358/135; 358/136
[58] Field of Search ............... 358/133, 135, 136, 138, 358/260

[56] References Cited

U.S. PATENT DOCUMENTS

| | | | |
|---|---|---|---|
| 4,292,651 | 9/1981 | Kretz et al. | 358/135 |
| 4,519,085 | 5/1985 | Catros | 358/135 X |
| 4,725,885 | 2/1988 | Gonzales et al. | 358/135 |
| 4,742,391 | 5/1988 | Sorgi et al. | 358/135 X |
| 4,788,692 | 11/1988 | Takebagashi et al. | 358/135 X |
| 4,791,483 | 12/1988 | Miller | 358/135 |
| 4,831,636 | 5/1989 | Taniguchi et al. | 358/133 X |

*Primary Examiner*—James J. Groody
*Assistant Examiner*—Victor R. Kostak
*Attorney, Agent, or Firm*—Lewis H. Eslinger; Jay H. Maioli

[57] ABSTRACT

A differential pulse code modulation apparatus comprises an error signal generator for receiving an input video signal comprising successive words representing video samples, and being operative to produce therefrom an error signal of which successive words each represent a difference between a word of the input signal and a predicted value therefor, a compander for compressing and expanding the error signal to produce a received video signal, an adder for adding successive words of the received video signal to successive words of a predicted value signal representing the predicted values to produce a received error signal, and a predictor responsive to the received error signal to produce the predicted value signal, the transfer function of the compander having been established in dependence on the minimum numbers of quantizing levels required to quantize a picture element of a video signal without the quantization levels being visually apparent for each of a range of input frequencies of the video signal.

8 Claims, 11 Drawing Sheets

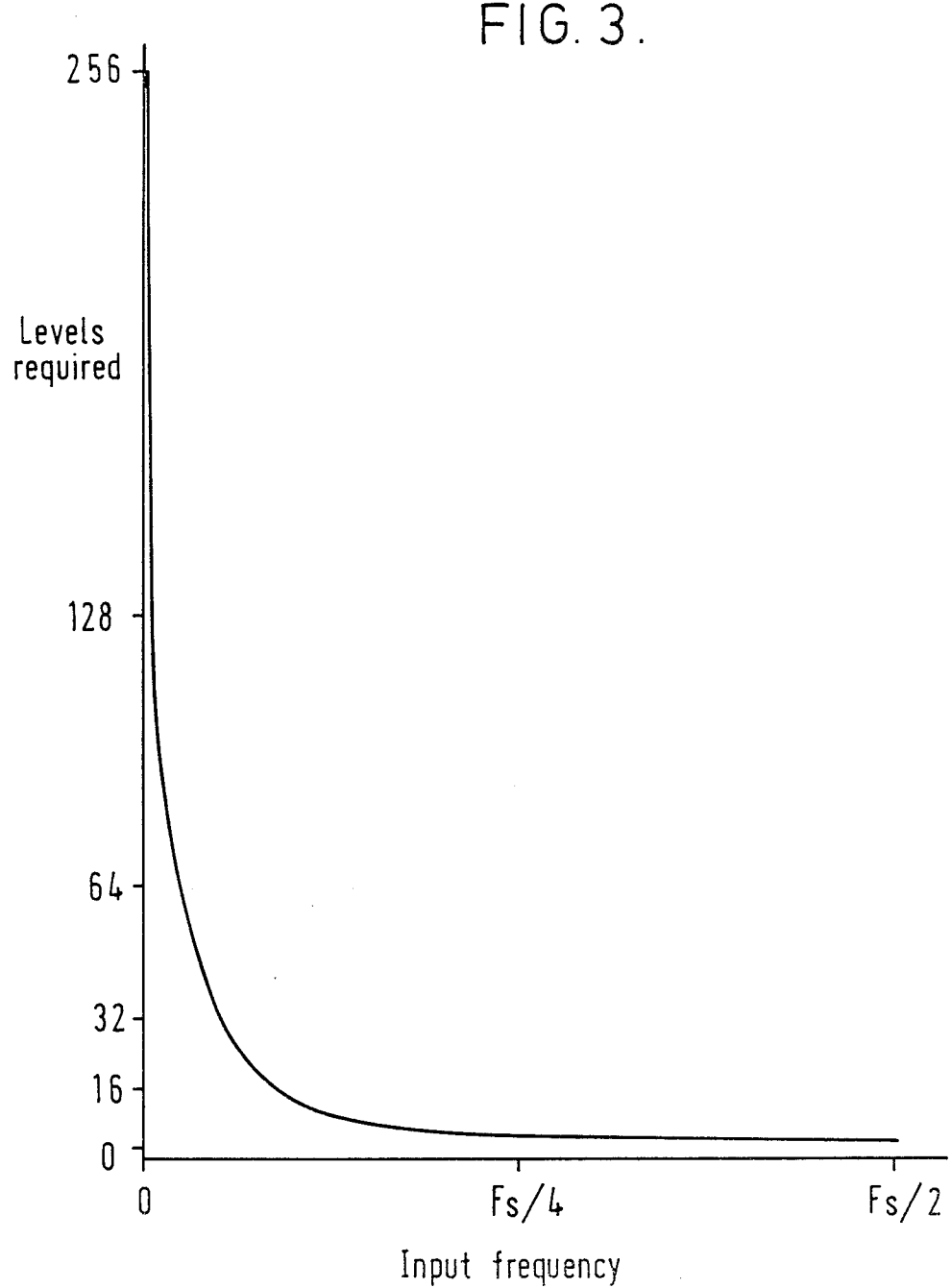

METHOD AND APPARATUS FOR DPCM VIDEO SIGNAL COMPRESSION AND TRANSMISSION

BACKGROUND OF THE INVENTION

1. Field of the Invention

This invention relates to differential pulse code modulation (DPCM) apparatus, and to methods of establishing the transfer function of a compressor in such apparatus.

2. Description of the Prior Art

DPCM offers the possibility of data rate reduction, when storing or transmitting a video signal. For example, a proposed digital slow motion processor is required to store several seconds of a video signal in random access memory. This involves a very large amount of data and requires a correspondingly large amount of random access memory. If the number of bits required to represent each picture element (pel) of the video signal could be reduced, without unacceptable degradation in the quality of the picture derived from the reproduced video signal, then the amount of random access memory required could be reduced or the time duration of the stored video signal could be increased.

FIG. 1 of the accompanying drawings is a block diagram of a DPCM apparatus for processing an input video signal $X(i)$, already in pulse code modulated (PCM) form, to produce a DPCM output video signal TX for storage (or transmission). The input video signal $X(i)$ comprises successive digital words, in this example 8-bit words, which represent successive samples and are obtained by sampling and pulse code modulating an analogue video signal. It is assumed that the bits of each word arrive in parallel and are processed in parallel within the apparatus of FIG. 1. Accordingly, it is to be understood that the elements shown in FIG. 1 (and in the subsequent FIGS.) are, where appropriate, connected by multi-bit buses or highways.

DPCM relies on accurate prediction of each input sample of the input video signal $X(i)$, based on one or more samples that have been previously received. (Some prediction schemes suitable for a video signal are described below.) A predicted value of each input sample is subtracted from the input sample and the resultant difference or error signal $E(i)$ is compressed, and then stored or transmitted. A predicted value signal $X(p)$, comprising successive predicted sample values which are to be subtracted from successive input samples is obtained from a predictor 1 by expanding the compressed error signal $E(i)$, and adding the result to the predicted value signal $X(p)$. More specifically, the predicted value signal $X(p)$ is subtracted from the input video signal $X(i)$ in an error or difference signal generating means, which is in the form of a two-input adder 2 arranged to act as a subtractor, to produce the error signal $E(i)$ which comprises a sequence of words each representing the error or difference between an input sample word of the input video signal $X(i)$ and a predicted value of that input sample word. The error signal $E(i)$ is compressed by a compressor 3 to words of fewer bits to form the output video signal TX that can be stored or transmitted. The output video signal TX is also passed to an expander 4, which simulates an expander provided in apparatus for receiving the output video signal TX, so as to produce a received video signal RX. The received video signal RX is supplied to one input of a two-input adder 5. The output of the adder 5, at which appears a received error signal $X(o)$, is connected to an input of the predictor 1. The predictor 1 produces the predicted value signal $X(p)$, which is supplied to the adder 2 so as to be subtracted from the input video signal $X(i)$, and is also supplied to the other input of the adder 5 so as to be added to the received video signal RX to produce the received error signal $X(o)$.

The apparatus of FIG. 1 further comprises a clock pulse generator (not shown) which causes the above sequence of operations to be performed during each of a plurality of successive clock periods equal to the time spacing T of successive input sample words of the input video signal $X(i)$.

As shown in FIG. 2 of the accompanying drawings, which is a block diagram of a modified DPCM apparatus for processing an input video signal $X(i)$, the compressor 3 and the expander 4 of the apparatus of FIG. 1 may be implemented together in the form of a compander 11 which compresses and expands the error signal $E(i)$ to produce the received video signal RX. This modified apparatus also requires a separate compressor 12, having characteristics similar to the compressor 3 of FIG. 1, for producing the output video signal TX.

In the apparatus of FIG. 2, one of the most important features is the characteristic of the compander 11, which characteristic is of course repeated in the combined effect of the compressor 12 and the associated expander in the receiving apparatus.

Previous work on the transfer function of a compander such as the compander 11 of FIG. 2, has put most of the emphasis on the statistical behaviour of the error signal $E(i)$. By using standard test pictures and data logging equipment, it has been possible to build up probability maps of the error signal $E(i)$. Using these maps companders have been designed which have small quantization steps for high probability errors and progressively increasing quantization steps for decreasing probability errors. This technique allows the quantization noise to be filtered statistically giving pleasing results for the standard test pictures which have been used to generate the probability maps.

However, in a practical system, the video signal represents a picture the spectral content of which is substantially unpredictable, and therefore a compander having a transfer function based on the spectral content of standard test pictures does not necessarily give a particularly good result.

SUMMARY OF THE INVENTION

One object of the present invention is to provide an improved differential pulse code modulation apparatus.

Another object of the present invention is to provide a differential pulse code modulation apparatus wherein the transfer function of a compander uses a minimized number of quantization levels.

Another object of the present invention is to provide an improved method of establishing the transfer function of a compressor in a differential pulse code modulation apparatus.

According to the present invention there is provided a differential pulse code modulation apparatus comprising: error signal generating means for receiving an input video signal comprising successive words representing video samples, and being operative to produce therefrom an error signal of which successive words each represent a difference between a word of the input video signal and a predicted value therefor;

means for compressing and expanding the error signal to produce a received video signal;

adding means for adding successive words of the received video signal to successive words of a predicted value signal representing said predicted values to produce a received error sIgnal; and a predictor responsive to the received error signal to produce the predicted value signal;

the transfer function of said means for compressing and expanding the error signal having been established in dependence on the minimum numbers of quantization levels required to quantize a picture element of a video signal without the quantization levels being visually apparent, for each of a range of input frequencies of said video signal.

According to the present invention there is also provided a method of establishing the transfer function of a memory forming a compressor, in a differential pulse code modulation apparatus, for compressing bInary error words, derIved by predIcting successive N-bit input words to said apparatus respectively representIng successive samples of a video signal, into n-hit output words where N is greater than n, the method comprising the steps of:

determining the minimum numbers of quantization levels required to quantize a picture element of a video signal without the quantization levels being visually apparent, for each of a range of input frequencies of said video signal;

determining the error in the output of a predictor to he used for predicting the value of each said input word in dependence on the value or values of at least one earlier said input word, for the same said range of input frequencies;

determining from said numbers of quantization levels and said errors the maximum number of quantization levels required for each said error;

constructing from said maximum numbers of quantization levels a table relating substantially $2^n$ different outputs of saId compressor to respective ones of a corresponding number of contiguous ranges of said error words supplied to said compressor, in dependence on said maximum number of quantization levels required for said error words in the corresponding said range; and storing said table in said memory.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a quantization graph of the number of quantizatIon levels requIred against input frequencies;

FIGS. 9-1 through 9-3 are a composite computer-generated plot of predictor error against vertical and horizontal frequencies.

DESCRIPTION OF THE PREFERRED EMBODIMENTS

Figure 1:
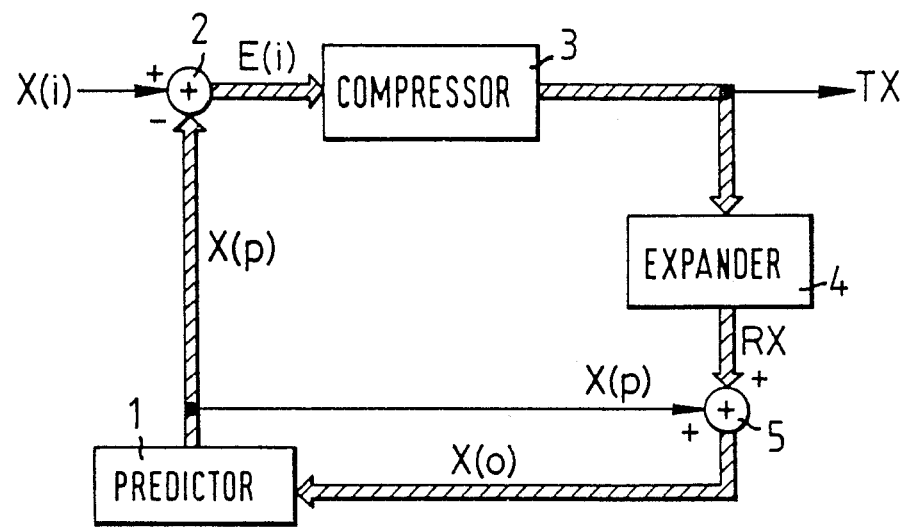
FIGS. 1 and 2 are block diagrams of respective DPCM apparatus.

It was mentioned above that previous work on the transfer function of a compander has put most of the emphasis on the statistical behaviour of the error signal. For a video signal to be satisfactorily digitally encoded, two conditions in particular must be satisfied. Firstly, there must be a sufficient number of luminance levels to make discrete grey levels invisible, and secondly there must be a high enough sample rate to cope with the maximum horizontal frequency; this latter being the requirement of the sampling theorem. Theoretically, to regenerate a video signal perfectly, both of these conditions must be met. Less obviously, it can he shown that subjectively a high spatial frequency requires fewer luminance levels than a low spatial frequency. In other words, the number of hits required to quantize a video signal is not constant, subjectively, for all spatial frequencies and amplitudes.

Consider, as one extreme example, an extremely fast edge consisting of an instantaneous transition from black to white. This could in fact be represented by a single bit where, for example, '0' represents black and '1' represents white. As another extreme example, consider a uniform transItIon from black to white extending over one complete horizontal line period. This might he considered as a ramp function with a period equal to one horizontal line period. It is generally accepted that to represent this requires eight bits, because approximately 256 different luminance levels are required to give the appearance to the human eye of a stepless transition from black to white. What this means is that if a compander souht to reduce the number of bits used for quantization simply by, for example, eliminating the three least significant bits from an 8-bit quantized signal, then this would give a perfectly satisfactory result in the first example of a fast edge, but would not give a satisfactory result in the second example of a ramp signal, because in the latter case luminance steps would be clearly visible to the eye. Put more generally, a ramp waveform with a period of one horizontal line will show grey scale quantization more pronouncedly than a ramp waveform with a substantially shorter period. This relationship between the number of bits required satisfactorily to quantize a picture element and the spatial frequency is used in the compander to be described below to reduce visible impairments in the final picture resulting from quantization noise.

To establish this relationship, tests were carried out using, for example, a zone-plate generator to synthesize spatial frequencies with varying resolution in terms of the number of luminance levels. This was done by setting up a linear ramp from black to white with a period of one horizontal line period. By switching out the least significant bits, it was possible to make quantization steps apparent. The horizontal frequency was then increased until these quantization steps became indiscernible to an observer. The horizontal frequency at which this occurred was recorded, and the next least significant bit was then switched out. The procedure was repeated until a set of points had been obtained giving the minimum possible number of quantization levels which could be used for spatial frequencies from zero (dc) to the sampling frequency. This is shown graphically as a quantization perception graph in FIG. 3, in which the required number of quantization levels are plotted as ordinates and the input frequencies as a fraction of the sampling frequency Fs are plotted as abscissae.

It is also necessary to understand that in a DPCM apparatus of the general kind described above with reference to FIGS. 1 and 2, the compander and the predictor should not be considered as separate units, because the performance of the predictor will affect the magnitude of the error signal E(i), depending on the direction of the spatial frequencies In the Image which the video signal represents. Because of this it is preferable for the characteristics of the compander to be matched to the predictor's worst case direction of prediction.

Figure 4:
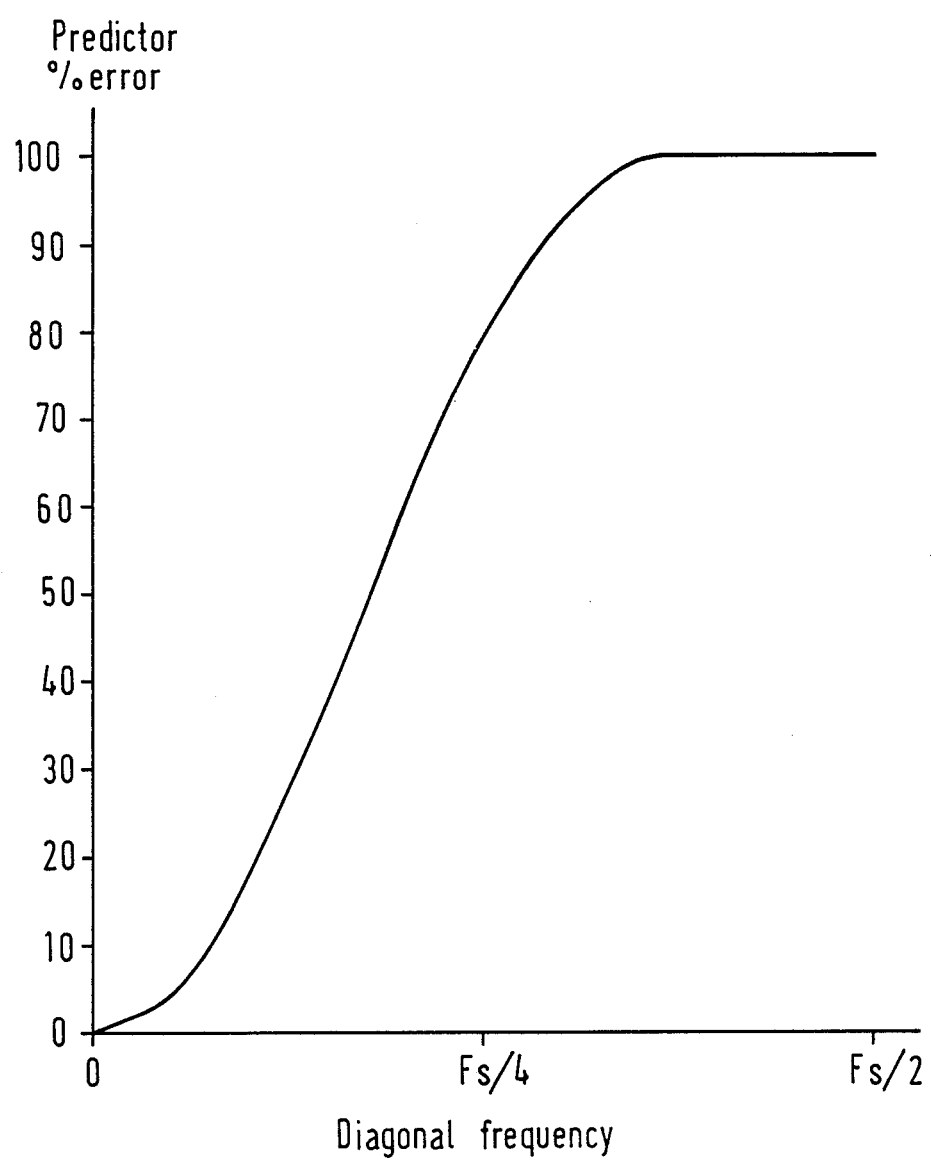
FIG. 4 is a predictor error magnitude graph for full amplitude inputs against diagonal spatial frequencies.

This is done using a computer generated plot of the maximum predictor error in two dimensions. FIG. 4 is a predictor error magnitude graph showing the magnitude of the maximum error along the diagonal axis of a two-dimensional predictor simulation (described below in connection with FIG. 9). The maximum error percentages are plotted as ordinates against diagonal frequencies as a fraction of the sampling frequency Fs as abscissae.

Figure 5:
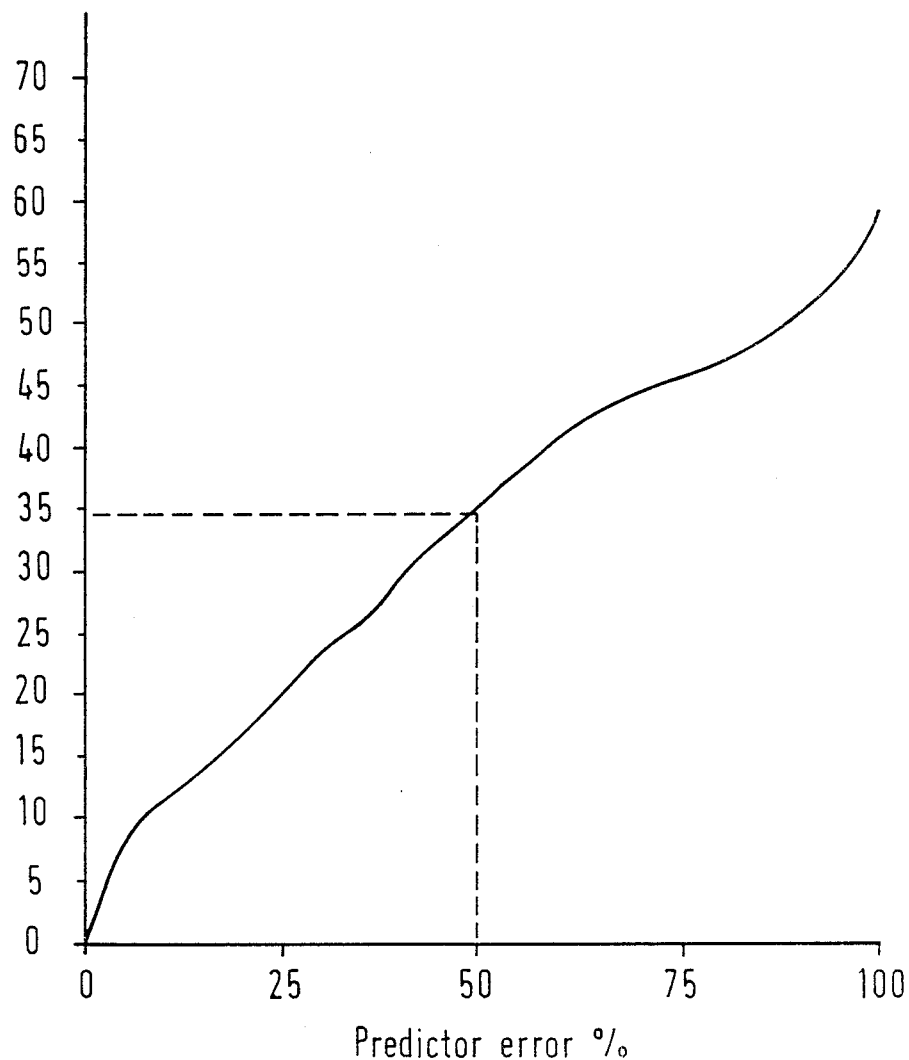
FIG. 5 is a step size graph of maximum required quantization step sizes against predictor errors.
Figures 2, 9:
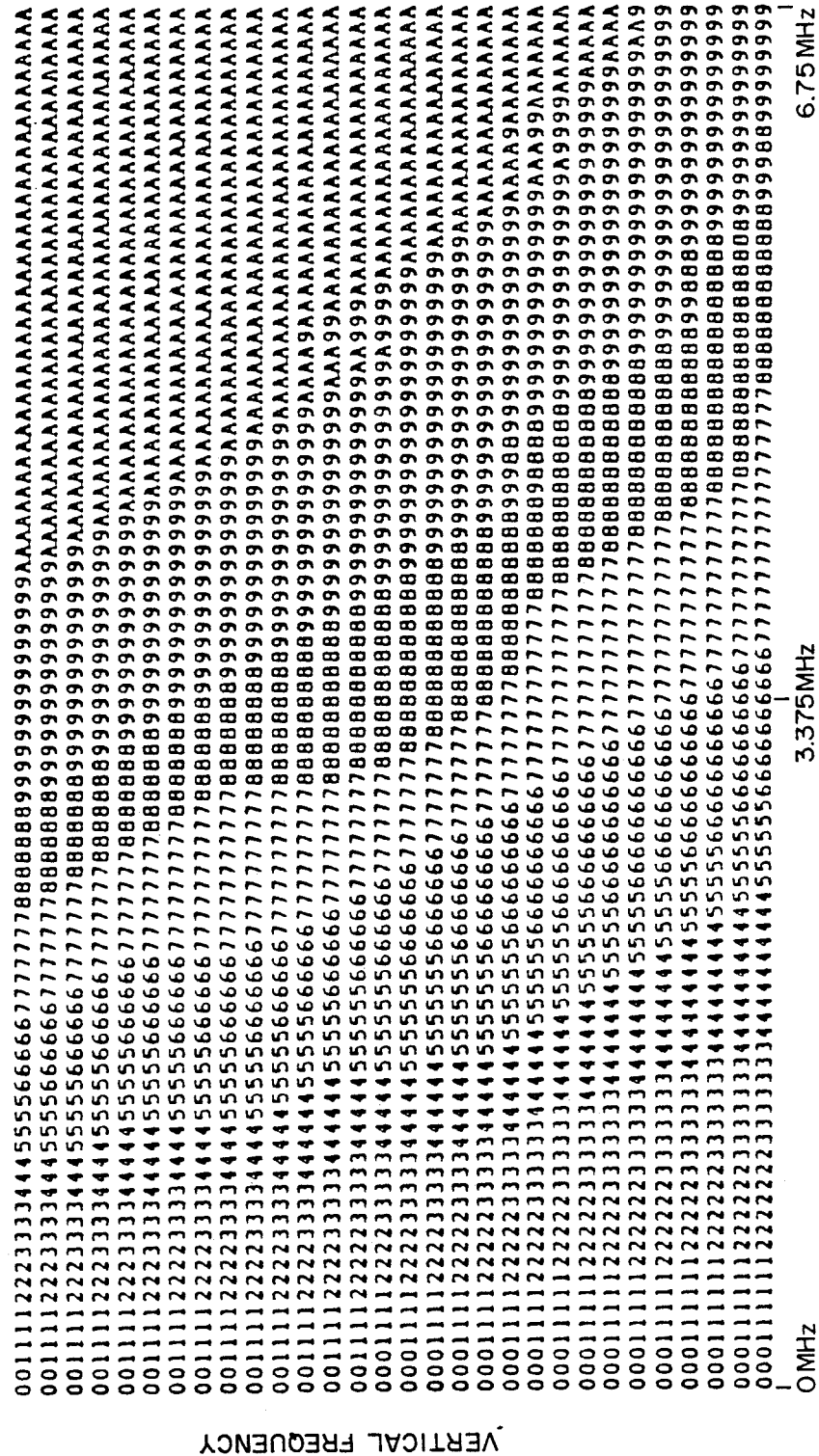
Figures 3, 9:
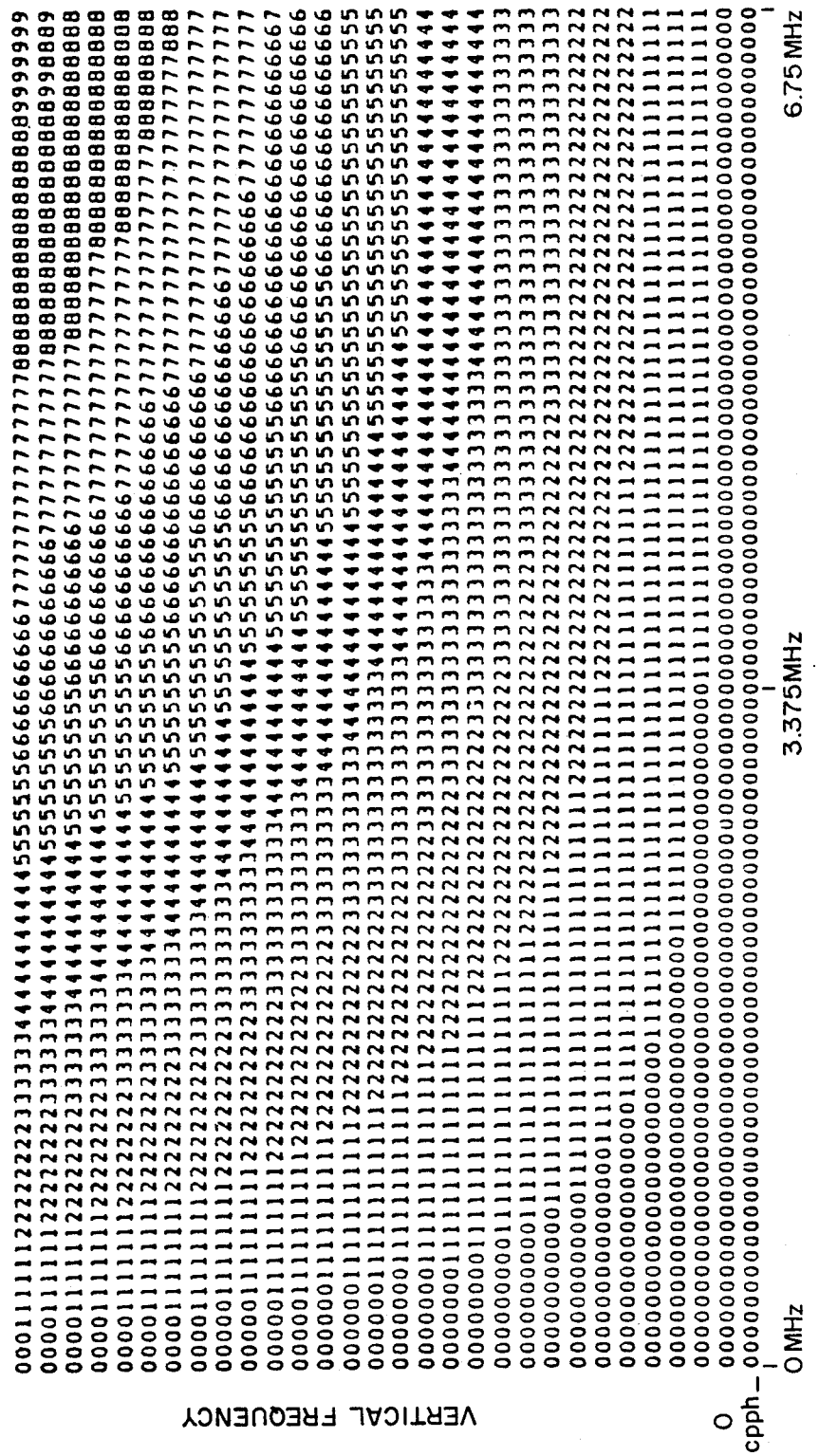

By dividing the quantization perception graph of FIG. 3 by the predictor error magnitude graph of FIG. 4 which is possible because both are plotted against frequency, a step size graph for the compander is generated as shown in FIG. 5. This division causes the predictor errors expressed as percentages to become the abscissae, and the ordinates are the required maximum quantization step sizes required in the compander for a given predictor error. Thus the graph of FIG. 5 indicates the number of quantization levels required in the compander for a given predictor error, and the predictor error is known because it is proportional, according to the law of FIG. 4, to the input frequency. For example, as indicated by the dotted lines in FIG. 5, when the predictor error is 50%, then approximately thirtyfive quantization levels are required in the compander. The step size graph of FIG. 5 is then used to desIgn the required limit case compander in which the quantizatIon effect due to the reduction in the number of bits should be just masked by the effect of high spatial frequency.

This is done as follows.

Figure 2:
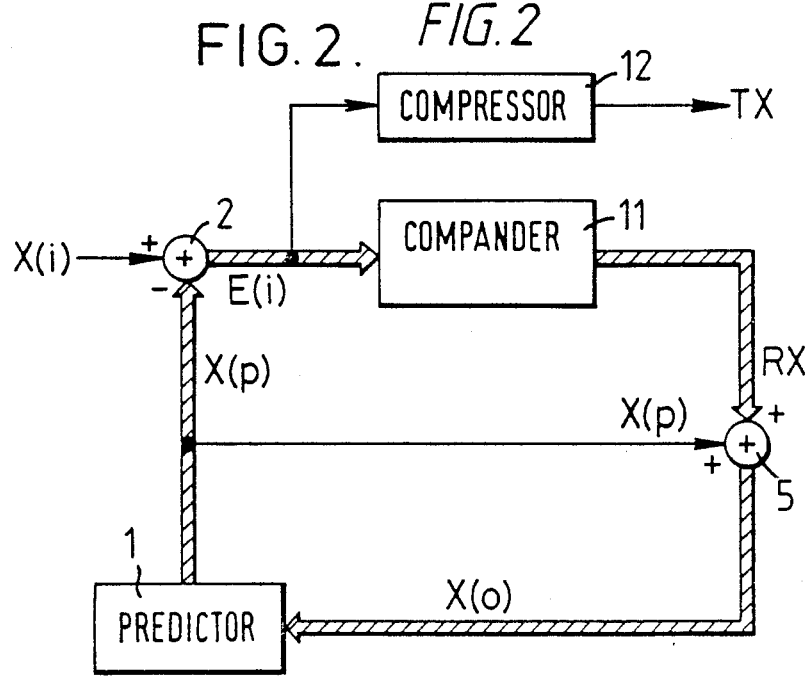
Figure 6:
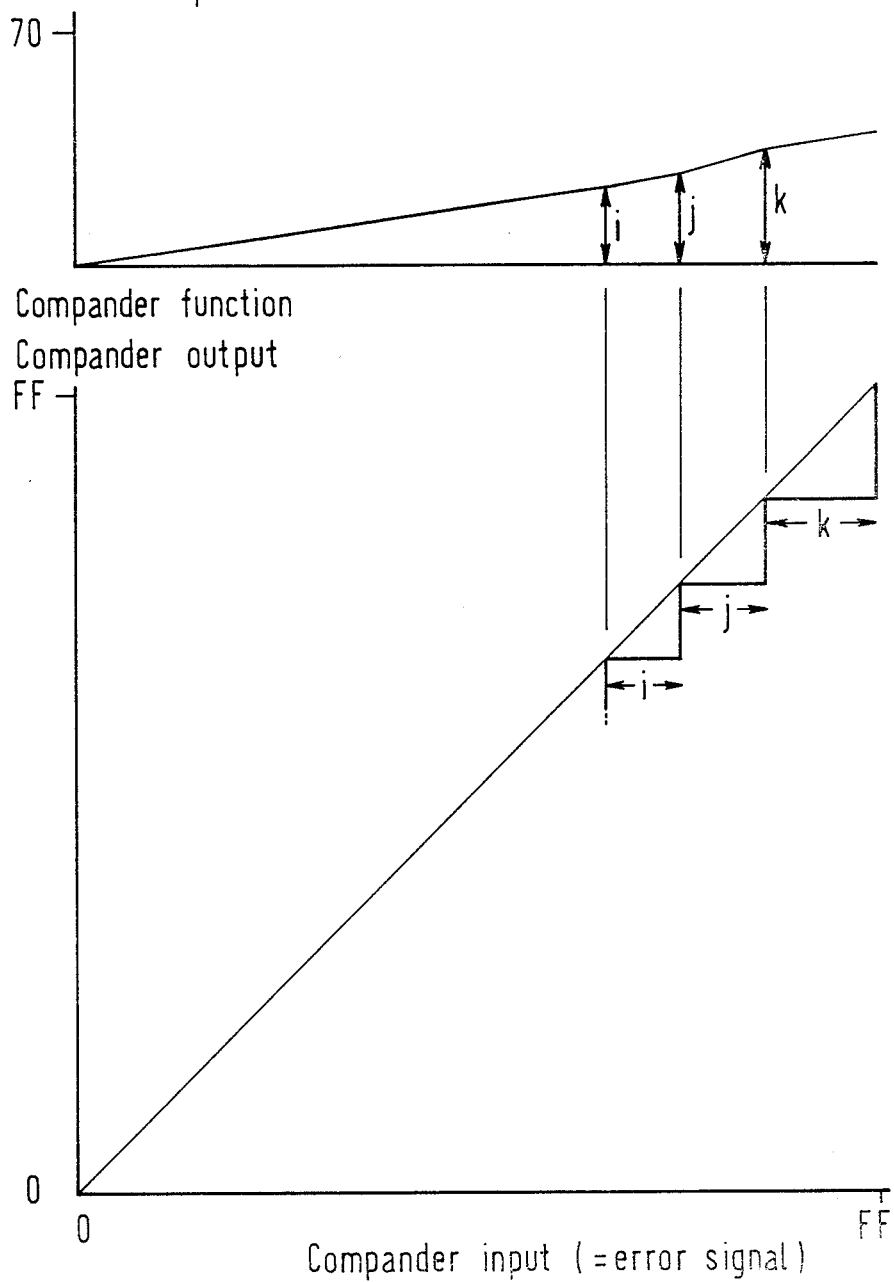
FIG. 6 is a diagram illustrating the construction of quantization steps for a compander.

In the apparatus of FIG. 2, Where the input video signal X(i) can have any one of 256 different quantization levels, then the error signal E(i) supplied to the compander 11 can have any value in the range, in hexadecimal, of minus FF or plus FF. As the loop gain in the compander 11 cannot exceed unity, that is the output cannot exceed the input, a staircase characteristic for the compander 11 is generated from the top down. Referring to FIG. 6 which illustrates the quantization step construction, the top graph is the step size graph of FIG. 5 with the ordinates compressed. Below this is a graph of the compander characteristic with outputs shown as ordinates and inputs shown as abscissae, both being in hexadecimal. For the top value, that is an input (error signal) of FF the output must be FF and the steps must follow the straight line from the point FF/FF back to the origin.

Figure 7:
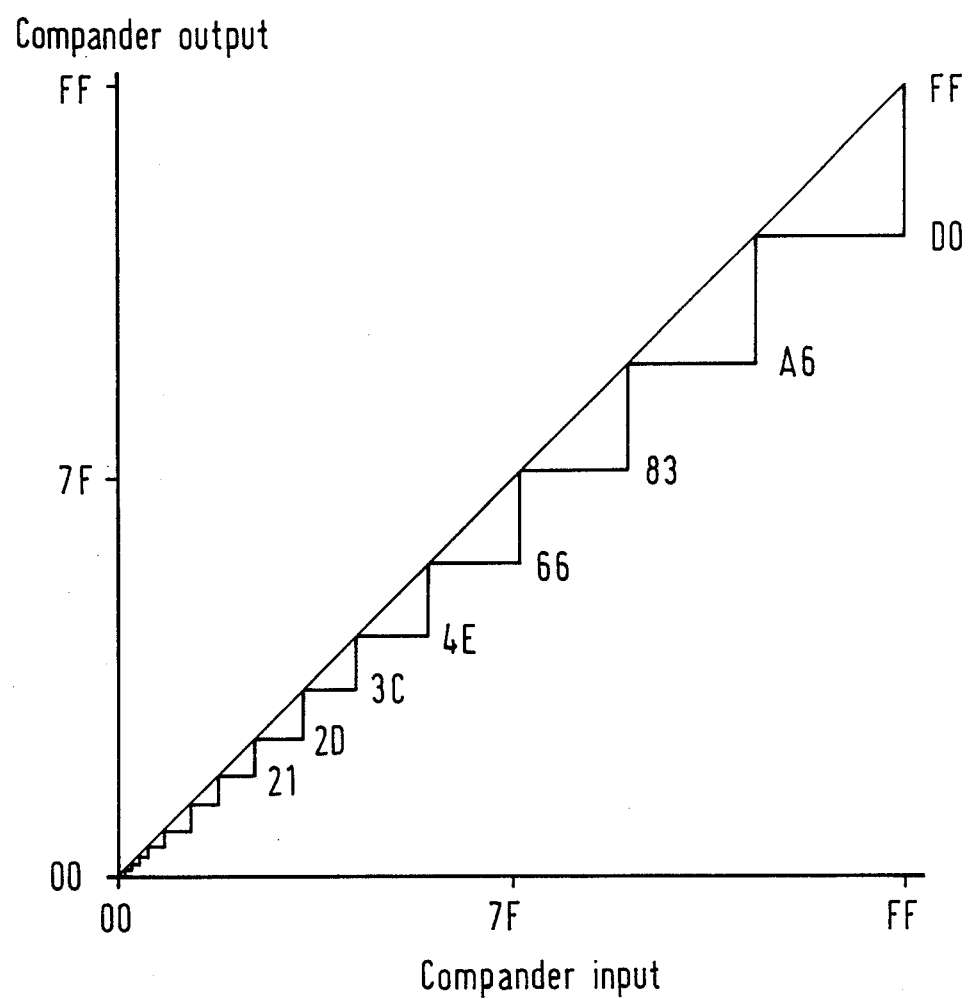
FIG. 7 is a diagram of the limit case of quantization steps for a compander.

From the top value on this straight line, the line is followed back until the compander step size is equal to the maximum step size, that is the step k is equal to k in the upper graph of FIG. 6. This point is then set as the next quantizing level, and the method is repeated for the succeeding steps; j=j, i=i, etc. until the entire range back to the origin has been completed. The limit case for a range of 00 to FF is shown in FIG. 7. In this particular example It was found that seventeen steps are requIred to transmIt a posItIve error sIgnal in the rane 00 to FF that is to convert any compander A6, D0 and FF. it will he noted that for small errors (which correspond to low frequencies) there is a one-to-one correlation between compander input and output, but as the errors increase in magnitude (corresponding to increasing frequency) an increasingly large range of inputs all result in the same output. At the top of the range all inputs from D0 to FF result in the output FF. Taking into account negative errors also, a total of 33 levels (17+16) are required. This is an inconvenient number, as it is just too large to represent with five bits.

The maximum step size graph at the top of FIG. 6 is therefore scaled by multiplying each value by the same number, and the above method is repeated with the object of reducing the number of steps to 32 or just below, which can be represented by five bits. Alternatively, if required, scaling can be effected to enable the compander output to be represented by some different number of bits such as three or four, although it should be understood that such compression cannot be achieved without a greater degradation in picture quality.

Thus, returning to the 5-bit example, a table is generated showing how any input error signal in the range +255 to −255 is to be converted to one of (say) 32 outputs which are designated 0 to 31 and represented by a 5-bit output.

The compressor 12 of FIG. 2 is therefore implemented as a memory, preferably a programmable read-only memory (PROM), holding a look-up table, and which on receiving an 8-bit input in the (decimal) range −255 to +255 converts this to a 5-bit output. The compander 11 of FIG. 2 is implemented as a like PROM plus a further PROM holding a look-up table, and which on receiving a 5-bit input supplies the corresponding 8-bIt output. A PROM similar to this latter PROM in the compander 11 is provIded in the apparatus receiving the received video signal TX.

The predictor 1 of FIGS. 1 and 2 will now he further considered. The predictor 1 has to predict the value of each input sample of the input video signal X(i), based on one or more samples that have been previously received. The options available are to use previous samples In one or two spatial dimensions, with or without samples from the temporal dimension, that is, from a previous field or fields. For simplicity only predictors using previous samples In one or two spatial dImensIons will be considered here, although it will readily be understood that the invention can be applied to DPCM apparatus using other predictors.

Figure 8:
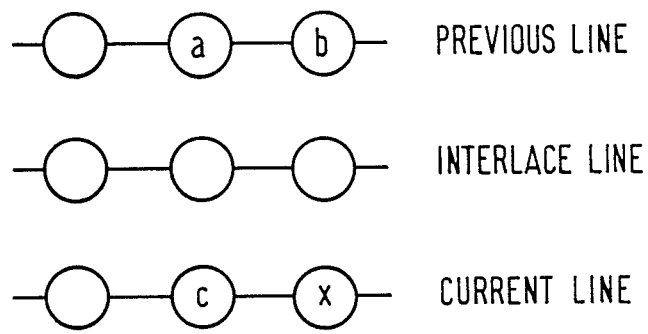
FIG. 8 shows diagrammatically part of a sample array of a video signal.

FIG. 8 shows diagrammatically part of a sample array of a video signal. If x is the sample to be predicted then a one-dimensional predictor may take:

$$x = c$$

while a two-dimensional predictor may, for example, take:

$$x = c + b - a$$

In the latter case the predictor output can lie outside the normal sample range (0 to 255) and provision needs to be made for dealing with any such overflow or underflow.

Whatever the form of the predictor 1 that is selected it is possible to computer generate error magnitudes for full amplitude input in terms of vertical and horizontal frequencies, such that the maximum error at each point is calculated for all values of frequency and phase. The result for the two-dimensional predictor referred to above is shown in FIG. 9 where each number represents the centre point of a range. For example 0 is 0 to 5% error, 3 is 25 to 35% error, and A is 95 to 100% error. A cross-section from the origin to the point of maximum error gives the predictor error magnitude graph shown in FIG. 4.

Referring again to FIGS. 1 and 2, the loop calculation time, that Is the time taken to perform the series of operations performed upon the arrival of each word of the input video signal X(i), must not exceed the data period of the signal X(i), namely the spacing T of the words of the input video signal X(i). The critical path that determines the loop calculation time is represented in FIGS. 1 and 2 by hatched lines. With the compressor 3, the expander 4 and the compander 11 implemented by PROMs, the loop calculation time is governed by the times involved in performing the addition operations in the adders 2 and 5, the time involved in reading the PROMs, and the time delay in the predictor 1.

Consider the simpler form of the predictor 1 referred to above where each predicted input sample value is the received previous value, in which case the predictor 1 is a delay element which imposes a delay, represented mathematically as $Z^{-1}$, equal to the spacing T. The delay element is a latch (more specifically, a group of parallel-operating latches equal in number to the number of bits in each input word) triggered at the spacing T. In this case, the loop calculation time is governed by the times involved in performing the addition operations in the adders 2 and 5, the time involved in reading the PROMs, and the set-up and propagation times of the latch used for the predictor 1. If, for example, the DPCM apparatus In FIG. 2 is implemented in transistor-transistor logic (TTL) using a simple (one latch) form of the predictor 1 as just described the shortest loop calculation time that currently can be achieved would be somewhere around 70 ns. That Is, the spacing T must be greater than around 70 ns.

In general of course, the predictor 1 will be of more complex form using several previous samples. This introduces further elements into the critical path, thus increasing the loop calculation time.

Figure 10:
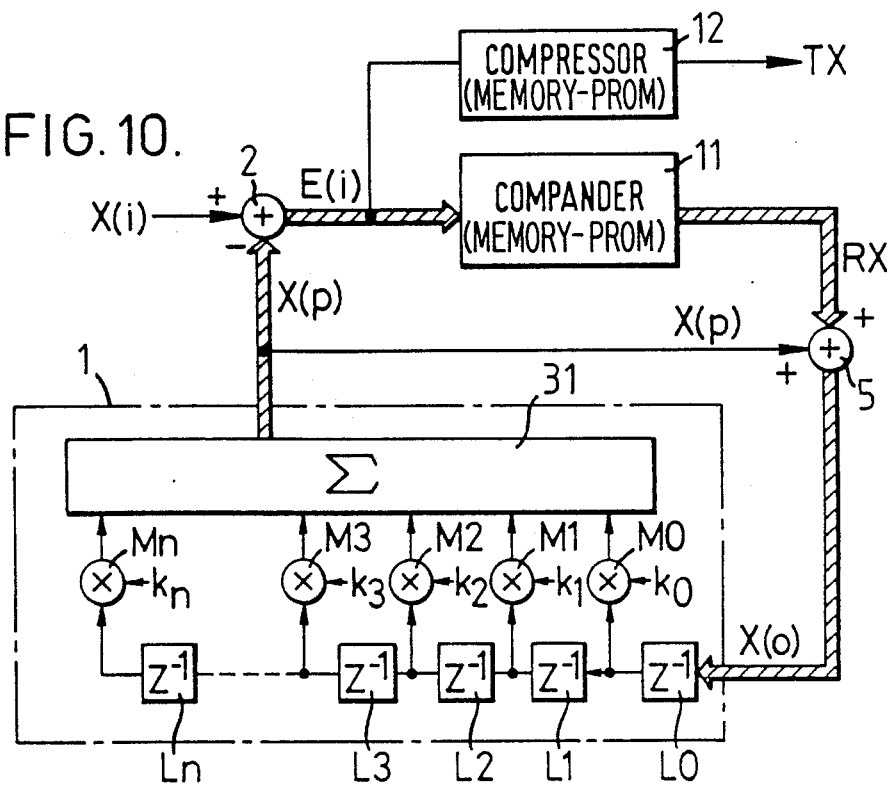
FIGS. 10 and 11 are block diagrams of respective embodiments of DPCM apparatus according to the present invention.

FIG. 10 shows an embodiment of DPCM apparatus with the predictor 1 shown implemented in a generalised way for using a plurality (n+1) of previous samples to produce each predicted sample value. The predictor 1 is shoWn as comprising (n+1) latches ($Z^{-1}$ delay elements) L0 to Ln connected in tandem. An output of each of the latches L0 to Ln is connected to a respective one of (n+1) multipliers M0 to Mn in which a sample transmitted from the associated latch is multiplied by a respective one of (n+1) multi-bit weighting coefficients k0 to kn before being passed to a summing means 31. The summing means 31 adds together the (n+1) inputs it receives from the multipliers M0 to Mn to produce the predicted value signal X(p).

The predictor 1 of FIG. 10 functions as follows. During successive clock periods, samples arriving from the adder 5 are stepped through the latches L0 to Ln In a manner resembling the operation of a shift register. Thus, at any time, the latches L0 to Ln hold the previous (n+1) samples of the received error signal X(o) from the adder 5. During each clock period, the contents of all of the latches L0 to Ln are read into the multipliers M0 to Mn and multiplied therein by the respective weighting coefficients k0 to·kn, the values of which are selected to weight the (n+1) samples so as to give a desired prediction characteristic. The resultant (n+1) product words or samples from the multipliers M0 to Mn are passed to the summing means 31 and, still during the same clock period, are all summed together to produce a single predicted sample of the predicted sample signal X(p).

It should he appreciated that the number of latches ($Z^{-1}$ delay elements) In the predictor 1 can be chosen at will In accordance with the desIred accuracy of prediction. Moreover, the predIctor 1 of FIG. 10 resembles a finite impulse response (FIR) filter as employed in image signal processing, and known techniques for designing such filters may be used in implementing the predictor 1 of FIG. 10.

In FIG. 10, as in FIGS. 1 and 2, the critical path for the loop calculation time is shown by hatched lines. In the same way as for the simple predictor comprising a single latch, the loop calculation time is governed by the tImes involved In performing the addition operations in the adders 2 and 5, the time taken to read the PROMs, and the set-up and propagation times of a latch. Additionally, however, the loop calculation tim=comprises:

(i) the time taken for effecting multiplication in the multipliers M0 to Mn, which, since they operate in parallel, is the operating time delay of any one of them (assuming that they operate at the same speed) or is the operating time delay of the slowest one of them; and (ii) the time taken in the summing means 31 to add together the (n+1) products arrIvIng from the (n+1) multipliers M0 to Mn to produce the predicted sample.

The additional time taken for multiplication will depend upon whether or not the Weighting coefficients k0 and kn are binary coefficients, that is, have a value $2^p$ where p is an integer. For binary coefficients, no delay need he introduced since an operation equivalent to multiplication can be performed merely by upwardly or downwardly shifting the significance of the bits of the words passed from the latches L0 to Ln to the summing means 31 by p places. The binary coefficient may be fractional or greater than unity, the range for p (in the case of an 8-bit word) being from −7 to +. The usual case would in fact involve a downward shift since the summation operation performed in the summing means 31 should give an output less than or equal to unity at dc (equal value of input words) for the sake of stability. If, however, the weighting coefficients are not binary coefficients, then the multipliers M0 to Mn must be used and a significant extra amount of time is taken to perform the multiplication operations.

The time taken in the summing means 31 to add together the (n+1) products is generally significantly greater than the time taken for effecting multiplication, even when the weighting coefficients are non-binary, and therefore generally has a greater adverse effect on the loop calculation time. The reason for this is that the summing means 31 has to be constituted, when the number of samples processed by the predictor 1 is greater than two, by an assembly of adders which each can add only two words, and at least some of these adders have to operate in sequence within the same clock period.

Substantially the same effect as that accomplished by the predictor 1 of the apparatus of FIG. 10 can be achieved by modIfying the configuration of the predictor in such a manner that the adders are distributed among the delay elements such that, in each clock period, the adders all operate simultaneously with one another. In spite of the fact that the addition is not performed as a final step after the words have all been put in theIr correct temporal relationship and weighted, the net result is the same. However, as will be demonstrated below, the result is achieved in such a manner that the loop calculation time turns out to be independent of the number of samples employed in calculating each word of the predicted value signal X(p).

Figure 11:
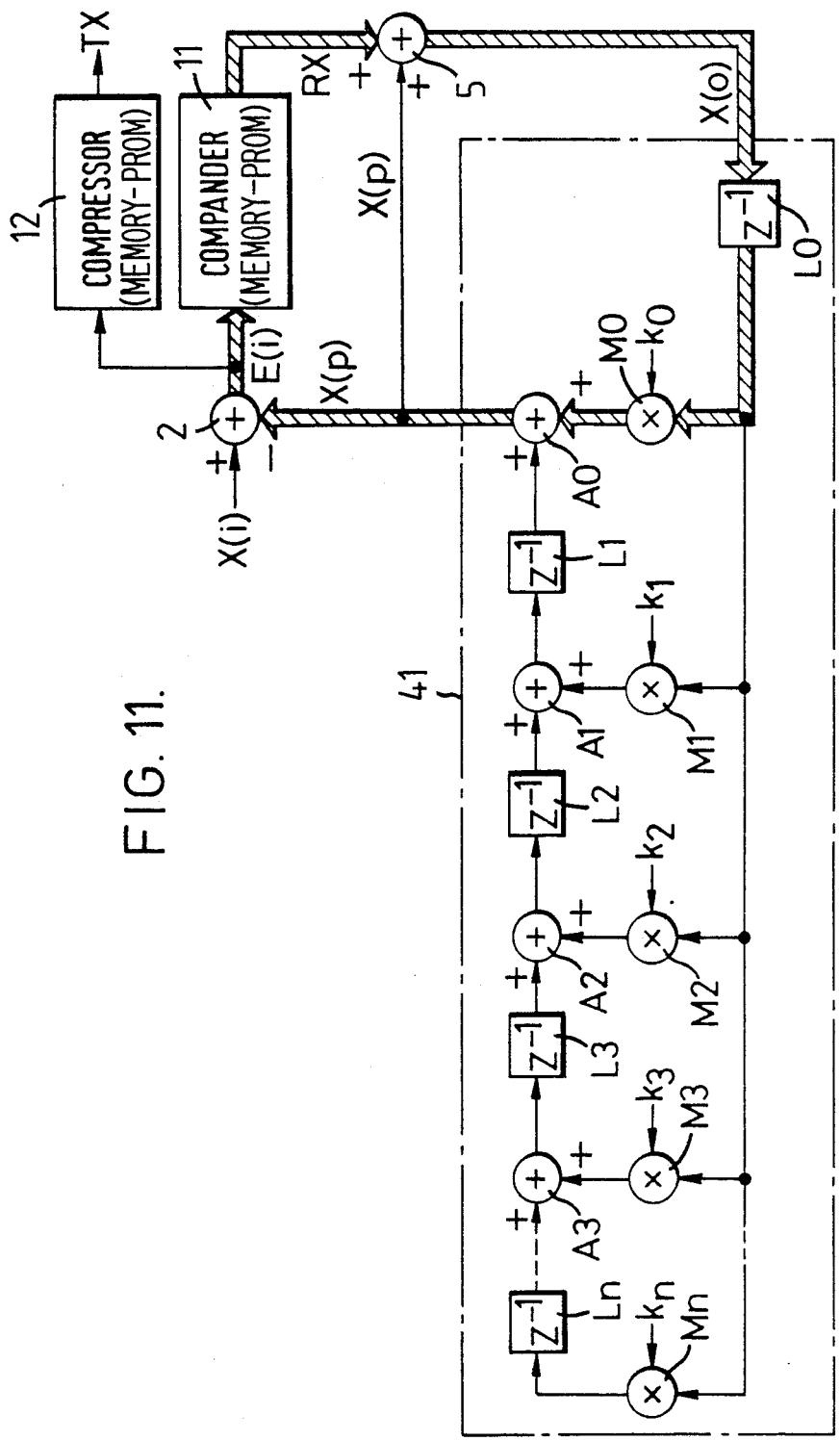

An embodIment of DPCM apparatus according to the present invention and comprising such a predIctor is shown in FIG. 11 and includes a predictor 41 which, like the predictor 1 of the apparatus of FIG. 10, comprises latches LO to Ln and multipliers Mo to Mn supplied with respective weighting coefficients ko to kn. The predictor 41 further comprises adders AO, A1, A2, A3, etc. As shown in FIG. 11, the adders AO, etc., the multipliers MO, etc. and the latches (delay elements) L1, etc. are arranged so as to form a ladder network. The received error signal X(o) is applied via the latch LO to a first side of the ladder network such that each word from the latch LO is applied simultaneously to all of the multipliers MO etc., which are arranged in the rungs of the ladder network. The adders AO, etc. are arranged at the nodes of the second side of the ladder network and the latches L1, etc. are arranged between the adders in the second side of the ladder network.

In use, at the start of each clock period, the same word of the received error signal X(o), as supplied by the latch LO, is supplied to and weighted by each of the multipliers MO, etc. Thereafter, during the same clock cycle, with the exception of the weighted word emerging from the multiplier Mn, the weighted words are added in the adders AO, etc. (which operate substantially simultaneously with one another) to a word stored in the latches L1, etc. during a previous clock cycle. As each weighted word works its way along the upper half of the ladder network from left to right in FIG. 11, it has added thereto, during each successive clock cycle, a weighted word from a subsequent clock cycle. Thus, during each clock cycle, as in FIG. 10, the output word produced by the predictor 41 (that Is, from the adder AO) Is the result of addition, with appropriate weighting, of input words received during the appropriate number of previous clock periods. That is, as in FIG. 10, each word produced by the predictor 41 (from the adder AO) is a predicted value of an input word based upon a plurality of successive words of the received error signal X(o). However, the various addition steps have been performed during a succession of clock cycles as the word was stepped along the ladder network, by the simultaneously operated adders A0, etc., instead of being performed sequentially at the end of each clock cycle.

As in FIGS. 1 2 and 10 the critical path corresponding to the loop calculation time is depicted in FIG. 11 by hatched lines. As in the case of the simple (one latch) predictor described above, the loop calculation time is governed by the times involved in performing the addition operations in the adders 2 and 5, the time involved in reading the PROM of the compander 11 and the set-up and propagation times of a single latch, namely the latch LO. Additionally, the loop calculation time is governed by the times taken for the operation of a single multiplier (the multiplier MO) and a single adder (the adder AO). Thus, pursuing the numerical example given above for implementation in TTL, the loop calculation time of around 70 ns in the case of the simple (one latch) predictor is increased, in the case of FIG. 11, to around 90 ns If the weighting coefficients are binary and to somewhere over 100 ns if the weighting coefficients are non binary. Note, however, that the loop calculation time is not, in contrast to FIG. 10, increased as the number of taps (that is, the number of samples of the received error word used to calculate each predicted value) is increased.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A differential pulse code modulation apparatus comprising: error signal generating means having an input video signal comprising successive words representing video samples, for producing an error signal of which successive words each represent a difference between a word of the input video signal and a predicted value therefor;

means for compressing and expanding the error signal to produce a received video signal;

adding means for adding successive words of the received video signal to successive words of a predicted value signal representing said predicted values to produce a received error signal; and a predictor in the form of a ladder network having multipliers supplied with respective weighting coefficients connected in the rungs of the ladder network, means for applying the received error signal to the nodes of a first side of the ladder network so that the received error signal is applied simultaneously to each of said multipliers, adders arranged at nodes of a second side of the ladder network, and delay elements arranged between nodes of said second side of the ladder network, whereby said predictor is responsive to the received error signal to produce the predicted value signal;

the transfer function of said means for compressing and expanding the error signal established in dependence on a predetermined number of quantization levels used to quantize a picture element of a video signal for each of a plurality of input frequencies of said video signal.

2. Apparatus according to claim 1 wherein said means for compressing and expanding the error signal comprises a memory.

3. Apparatus according to claim 2 wherein said memory is a programmable read-only memory.

4. Apparatus according to claim 1 wherein said error signal generating means comprises a subtracter which is supplied with the input video signal and the predicted value signal.

5. Apparatus according to claim 1 wherein said means for compressing and expanding the error signal comprises a compander and further comprising a compressor for compressing the error signal.

6. A method of establishing the transfer function of a compressor having a memory, in a differential pulse code modulation apparatus, for compressing binary error words, derived by predicting successive N-bit input words to said apparatus respectively representing successive samples of a video signal, into n-bit output words where N is greater than n, the method comprising the steps of:

determining a number of quantization levels required to quantize a picture element of a video signal for each of a plurality of input frequencies of said video signal;

determining the error in the output of a predictor to be used for predicting the value of each said input word in dependence on the value or values of a least one earlier said input word, for the same said plurality of input frequencies;

determining from said determined number of quantization levels and said errors a corresponding number of quantization levels for each said error;

constructing from said corresponding number of quantization levels for each said error a table relating substantially $2^n$ different outputs of said compressor to respective ones of a corresponding number of contiguous ranges of said error words supplied to said compressor, where n is the number of bits in the output word of the compressor, in dependence on said corresponding number of quantization levels required for said error words in the corresponding said range; and storing said table in said memory, whereby said table establishes the transfer function of the compressor.

7. A method of establishing the transfer function of a compander having a memory, in a differential pulse code modulation apparatus, for compressing binary error words, derived by predicting successive N-bit input words to said apparatus respectively representing successive samples of a video signal, into n-bit output words where N is greater than n, and for expanding said n-bit output words into respective successive N-bit output words corresponding respectively to said input words, the method comprising the steps of:

determining a minimum number of quantization levels required to quantize a picture element of a video signal, for each of a plurality of input frequencies of said video signal, by providing a linear ramp from black to white with a period of one horizontal line of a video signal and then successively increasing the horizontal frequency;

determining the error in the output of a predictor to be used for predicting the value of each said input word in dependence on the value or values of at least one earlier said input word, for the same said plurality of input frequencies;

determining from said minimum number of quantization levels and said errors the maximum number of quantization levels for each said error;

constructing from said maximum numbers of quantization levels a table relating substantially $2^n$ different, compressed outputs of said compander to respective ones of a corresponding number of contiguous ranges of said error words supplied, thereto, in dependence on said maximum number of quantization levels required for said error words in the corresponding said range;

storing said table in said memory;

constructing from said table a further table which is the inverse of said table; and storing said further table in said memory, whereby said tables establish the transfer function of the compander.

8. A method according to claim 7 wherein said step of storing includes storing said table in a programmable read-only memory.

* * * * *